United States Patent [19]

Gosselin et al.

[11] Patent Number: 4,937,088
[45] Date of Patent: Jun. 26, 1990

[54] METHOD OF AND APPARATUS FOR EXTRACTING JUICE AND MEAT FROM A FRUIT

[75] Inventors: Peter G. Gosselin, Springfield, Mass.; Ronald W. Kock, Wyoming, Ohio; Michael S. Kolodesh, Cincinnati, Ohio; Jeffrey T. Leitner, Cincinnati, Ohio; Bruce A. Pierson, Cincinnati, Ohio; H. Norman Reiboldt, College Corner, Ohio; David A. Sabatelli, Cleves, Ohio; Vicki L. Weber; William Willhite, Jr., both of Cincinnati, Ohio

[73] Assignee: The Procter & Gamble Company, Cincinnati, Ohio

[21] Appl. No.: 291,920

[22] Filed: Dec. 29, 1988

[51] Int. Cl.[5] .......................... A23P 1/00; A23L 1/212
[52] U.S. Cl. ...................................... 426/481; 99/551; 99/552; 99/516; 426/482
[58] Field of Search ...................... 426/482, 481, 506; 99/551, 552, 553, 516, 584

[56] References Cited

U.S. PATENT DOCUMENTS

| | | | |
|---|---|---|---|
| 1,374,289 | 4/1921 | Dunkley | 99/562 |
| 1,442,859 | 1/1923 | Coons | 99/564 |
| 1,631,854 | 6/1927 | Carroll | 99/590 |
| 1,878,099 | 9/1932 | Bost | 99/495 |
| 1,982,741 | 12/1934 | Keenan | 99/584 |
| 2,086,911 | 7/1937 | Hill | 99/513 |
| 2,114,217 | 4/1938 | Edenfield | 99/502 |
| 2,114,218 | 4/1938 | Edenfield | 99/502 |
| 2,134,608 | 10/1938 | Hawkins | 99/510 |
| 2,242,243 | 5/1941 | Ewald et al. | 99/590 |
| 2,255,049 | 9/1941 | Ewald | 99/590 |
| 2,551,156 | 5/1951 | Polk, Sr. et al. | 99/590 |
| 2,570,071 | 10/1951 | Polk, Sr. et al. | 99/590 |
| 2,737,989 | 3/1956 | Wurgaft | 99/502 |
| 2,766,794 | 10/1956 | Odale | 426/482 |
| 3,431,955 | 3/1969 | Heymann | 99/538 |
| 3,566,941 | 3/1971 | Morikawa | 99/516 |
| 3,700,017 | 10/1972 | Vincent et al. | 99/590 |
| 3,982,482 | 9/1976 | Webb et al. | 99/491 |
| 4,294,861 | 10/1981 | Ifuku et al. | 426/475 |
| 4,300,448 | 11/1981 | Hayashi et al. | 99/516 |
| 4,421,021 | 12/1983 | Holbrook | 99/504 |
| 4,479,424 | 10/1984 | Carroll | 99/502 |
| 4,560,572 | 12/1985 | Watanabe | 426/616 |
| 4,690,047 | 9/1987 | Balzano | 99/542 |
| 4,700,620 | 10/1987 | Cross | 99/510 |
| 4,727,802 | 3/1988 | Gonzalez | 99/494 |
| 4,729,299 | 3/1988 | Hatch | 99/491 |
| 4,732,771 | 3/1988 | Bushman | 426/482 |
| 4,765,233 | 8/1988 | Genchev et al. | 99/472 |
| 4,765,234 | 8/1988 | Cailliot | 99/593 |

Primary Examiner—George Yeung
Attorney, Agent, or Firm—John J. Ryberg; John V. Gorman; Richard C. Witte

[57] ABSTRACT

A method of and apparatus for extracting the meat section and juice from a fruit while minimizing the amount of undesirable flavor components, e.g. peel oil, released from the fruit's peel. In one embodiment of the present invention, whole fruits are fed into a single station extraction apparatus that first cuts a equatorial groove in the fruit's peel while the fruit is rotated. A semicircular coring blade is then inserted into the groove and rotated 360° which severs a spherical chunk of fruit meat from the peel. The small amount of fruit meat remaining on the peel's inner surface is then preferably extracted with a reaming element or fluid jet nozzle. In other particularly preferred embodiments, the grooving, coring, and reaming component mechanisms are incorporated into an indexing turret apparatus and a high-speed continuous motion turret apparatus.

20 Claims, 14 Drawing Sheets

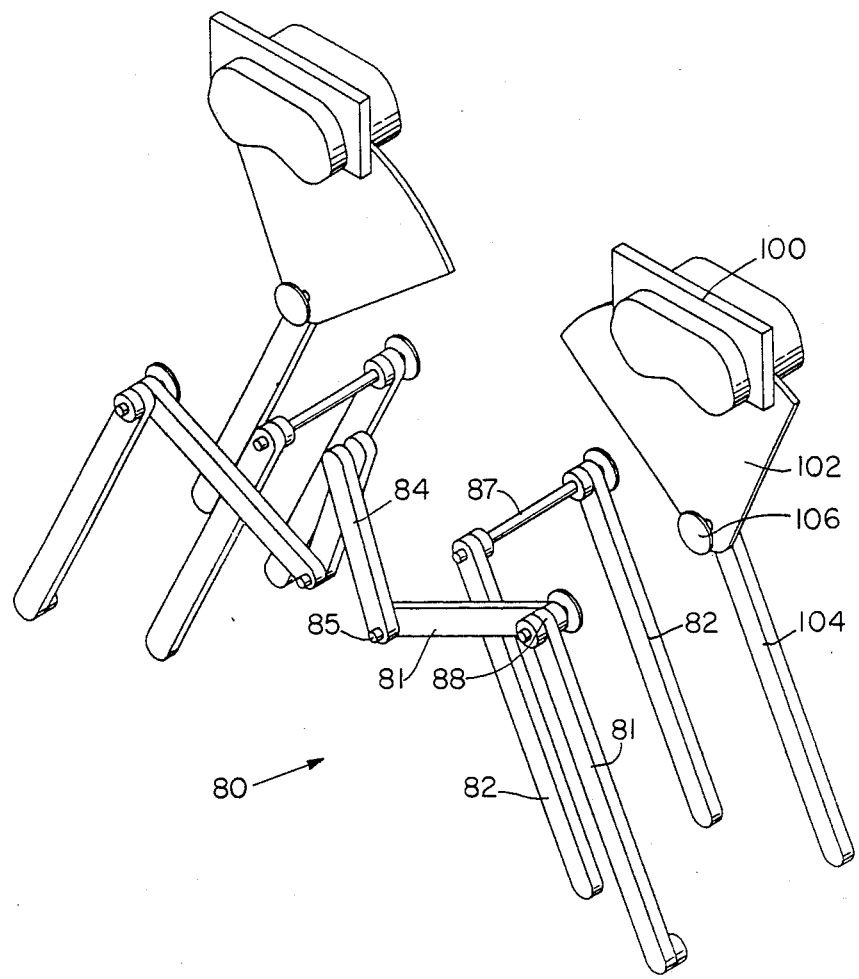

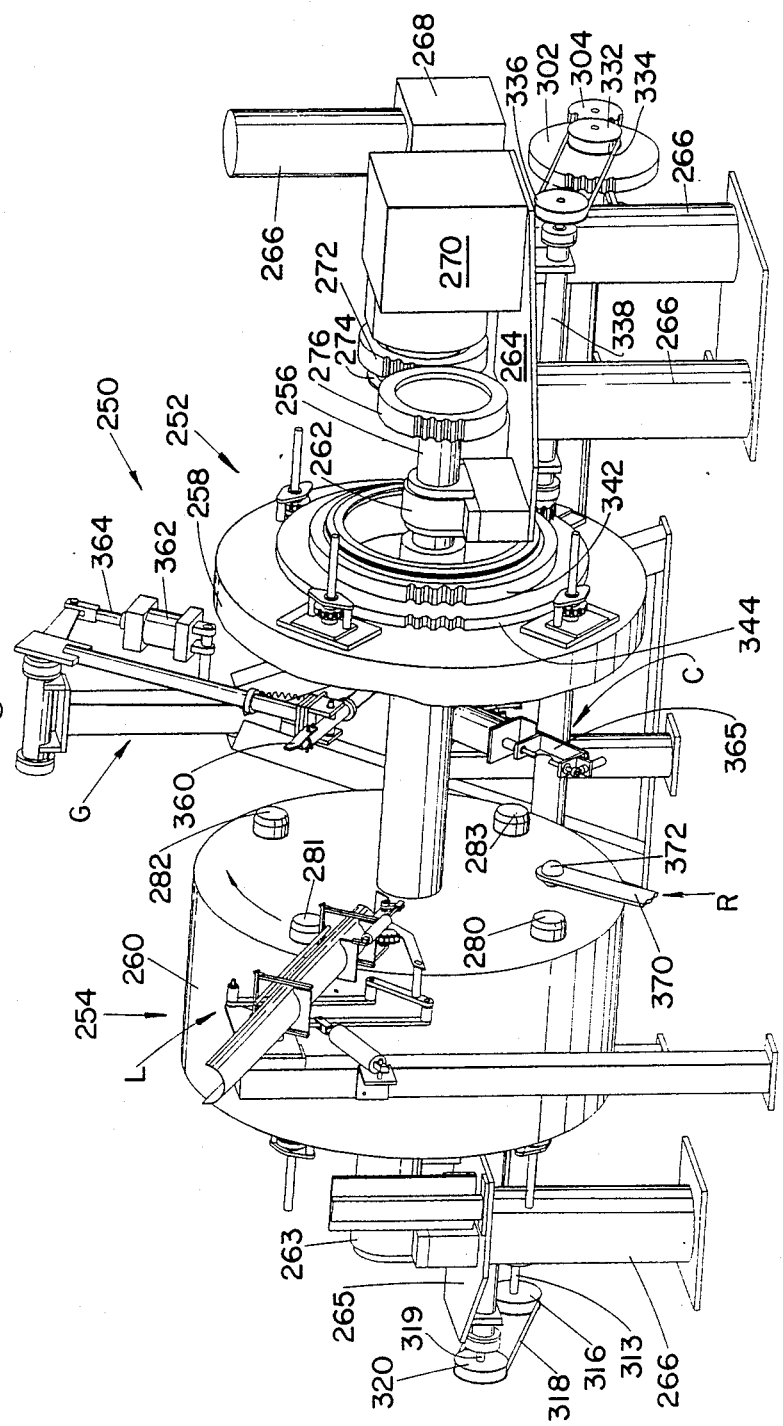

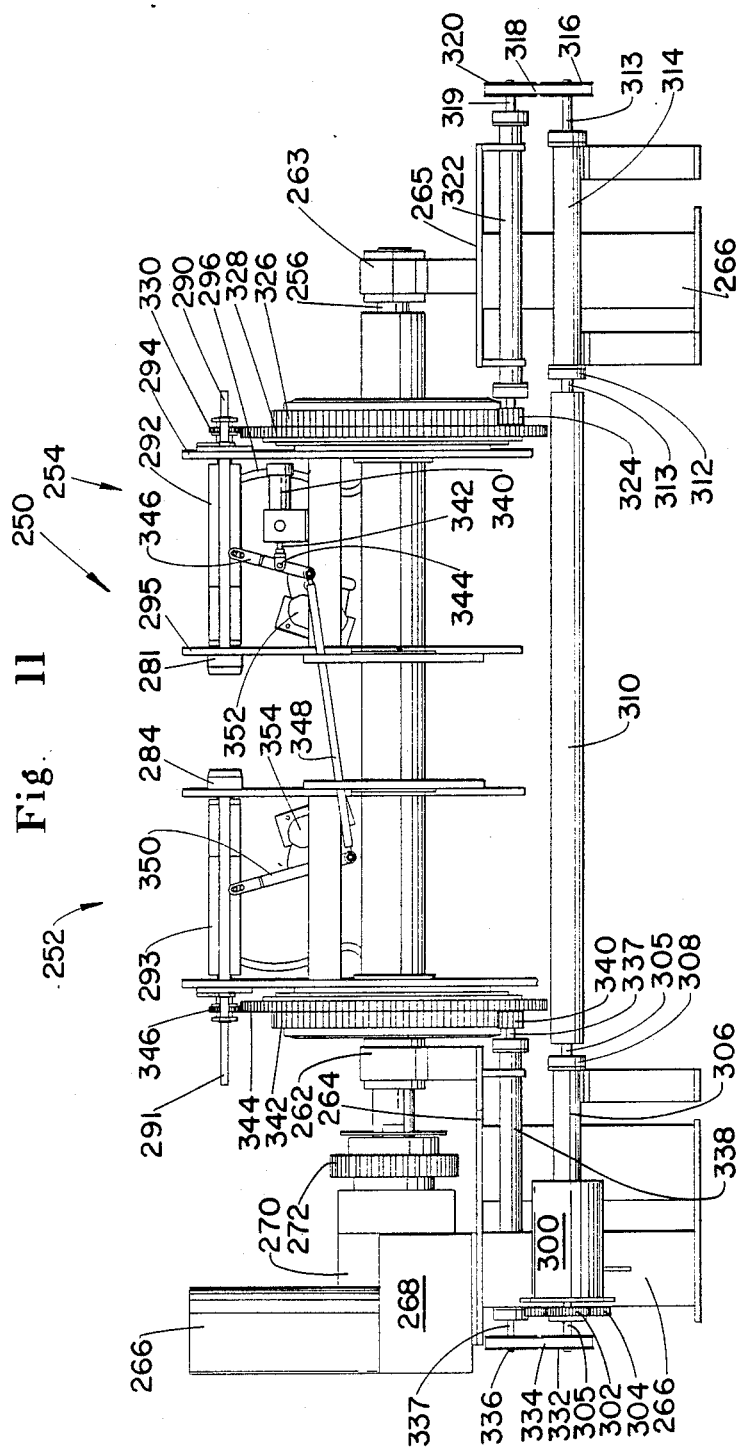

METHOD OF AND APPARATUS FOR EXTRACTING JUICE AND MEAT FROM A FRUIT

TECHNICAL FIELD

The present invention relates to extracting the edible components of a fruit, and more particularly to methods of and apparatuses for extracting the meat and juice from whole fruits. Even more particularly, the present invention relates to methods of and apparatuses for extracting whole juice sacs and juice from citrus fruits.

BACKGROUND OF THE INVENTION

Various fruit juices and beverages that contain fruit juice are very popular because of their appealing taste and also because they are perceived as being natural and nutritious. Commercially extracted and packaged fruit juices have enjoyed wide commercial success because of their convenience. However, it has been found that many consumers generally prefer the taste of hand-squeezed juice over commercially processed juice. Accordingly, a principal object of the present invention is to extract in a commercial environment the edible components of a fruit, particularly the juice and juice sacs, such that they have a taste similar to that of hand-squeezed.

Citrus fruits such as oranges, grapefruits, tangerines, o lemons, and limes basically consist of an outer colored peel (flavedo), an inner white spongy peel (albedo), and the inner meat formed in wedge-shaped segments that are separated by a fibrous membrane commonly referred to as "rag." The fruit also includes a pulpy core that contains several large and small seeds. The individual meat segments primarily consist of juice sacs, which are elongated or oval-shaped sacs that contain fruit juice and are held together by an epicuticular wax. In general, the fruit's juice sacs and juice are considered to be the most desirable components for human consumption purposes. The fruit's other components, i.e., the peel, rag, and seeds, are very useful for other applications such as cattle feed.

The method used in extracting the edible components of a fruit greatly influences the final product's taste, texture, and overall quality. Generally, it has been observed that the cleaner, quicker, and more gently the fruit's juice and juice sacs are separated from the fruit's other components, the less the juice comes into contact and mixes with undesirable flavor elements, which include naringin, $\alpha$-terpineol, linalool, and d-carvone that are found in the peel; and limonin that is found in the seeds and membranes.

During hand squeezing, the consumer either intuitively or because of physical limitations presses lightly on the fruit which results in juice having less undesirable flavors than found in commercially extracted juice. This gentle pressure is difficult and not cost effective to duplicate in a mass production setting where high yields are absolutely critical. Indeed, most production machines in wide use today for extracting fruit juice can perhaps be most accurately characterized as fruit smashers. These machines essentially break the fruit into its various components and subsequently separate them by, for example, forceful screening, an example of which is the apparatus disclosed in U.S. Pat. No. 4,700,620 and leased by the FMC Corporation. During the bashing and separating steps, the fruit's components undergo much abrading and co-mingling, thus releasing and mixing the undesirable flavor elements that are found in the peel, membranes, and seeds with the juice. In addition, such rough handling essentially guarantees that none of the fragile juice sacs will survive intact.

Another type of apparatus used in the commercial juice extracting industry can be generally characterized as a reamer, examples of which are disclosed in U.S. Pat. Nos. 2,737,989 to Wurgaft and 4,479,424 to Carroll. In a basic reaming operation, the fruit is first cut in half, followed by pressing a reaming element into the exposed fruit meat to extract the juice. In general, it has been found that this type of extraction method produces low quality juice because the reaming element also squeezes the peel, membranes, and seeds, thereby releasing the undesirable flavor components found in each. In addition, in the case of a citrus fruit, the sectional membranes tend to fold over on top of one another when the reamer is forced into the fruit half, thereby making it extremely difficult to extract the fruit meat and juice deep within the fruit half. Indeed, because of the critical need for high yields in a commercial operation, most extractors find it necessary to press the reaming element very hard into the fruit which further aggravates the problem.

Another type of fruit extraction method and apparatus is generally referred to as a peeler, an example of which is disclosed in U.S. Pat. No. 3,700,017 to Vincent et al. In such a system, an oriented fruit is placed between two spikes that are sharply shoved into the stem ends of the peel. The spikes and attached fruit are then rotated while two knives move laterally across the rotating fruit to cut the peel from the meat. Although such a system does effectively extract fruit meat from the fruit, it has been found that cutting the peel in this fashion releases a substantial amount of the undesirable flavor components found therein which contaminates the inner meat. In addition, peeling techniques typically require a strong spike/peel connection to maintain a high peeling torque, which in turn requires the critical orienting step in order to insert the spike into the fruit's stem area where the peel thickness is greatest.

Another type of extraction system involves using various chemical baths such as alkali/phosphate or acid to dissolve the sectional membranes, examples of which include U.S. Pat. No. 4,560,572 to Watanabe and U.S. Pat. No. 4,139,651 to Sekiguchi. However, it is believed that such systems would be extremely unattractive in a commercial environment because of the high costs associated with the necessary chemicals. In addition, it is believed that the chemicals used in such processes would have a major adverse effect on the fruit juice's taste.

Still another extraction technique involves using high pressure fluid jets, examples of which include U.S. Pat. Nos. 1,982,741 to Keenan, 4,294,861 to Ifuku et al., and 4,300,448 to Hayashi et al. Generally, this type of system includes the critical steps of orienting the fruit relative to its stem and cutting the fruit in half perpendicular to the stem, followed by placing the exposed fruit meat in front of a fluid jet nozzle. High pressure fluid emitted from the nozzle blasts the juice and fruit meat from the peel. However, it has been found that this type of extracting system is commercially unattractive because of the large volume of pressurized fluid required to extract a commercially acceptable yield. In addition, as with reaming, the sectional membranes tend to fold over and impede the emitted fluid's ability to remove the meat deepest within the peel.

In light of the above, the principal object of the present invention is to extract juice from a fruit such that it has a taste similar to that of hand-squeezed.

Another principal object of the present invention is to extract fruit meat from a fruit without rupturing a substantial portion of the fragile juice sacs.

Another principal object of the present invention is to extract fruit meat and juice from a fruit without extracting undesirable flavor elements from the peel, membranes, and seeds.

Yet another object of the present invention is to achieve high juice yields in a commercial environment.

Another object of the present invention is to extract large pieces of fruit meat from a fruit that can be subsequently separated into unruptured juice sacs and juice.

Another object of the present invention is to extract a very substantial portion of the fruit meat and juice from a whole fruit while exerting little pressure on the fruit's peel.

SUMMARY OF THE INVENTION

In practicing the present invention, a large quantity of whole fruits is preferably first separated into groups according to size. Next, the fruits are cleaned by using any one of several approved methods and apparatuses well known to those skilled in the art of fruit processing. The sized and cleaned fruits are then fed into the loading mechanism component of a fruit meat and juice extraction apparatus. Of particular significance is that the loading mechanism does not orient the fruits relative to their stems.

In one preferred embodiment of the present invention, the loading mechanism feeds individual fruits into a single station extraction apparatus that includes two opposed, rotating resilient cups. A four-bar centering mechanism moves the two cups toward each other such that the fruit is firmly grasped therebetween. Next, a grooving mechanism having a sharp grooving blade is brought into tangential contact with the rotating fruit which cuts a equatorial groove in the fruit's peel. A coring element having a sharp, semicircular coring blade that is slightly smaller in diameter than the fruit's peel is then inserted into the groove and rotated 360° which cleanly severs a spherical piece of fruit meat from the peel. The cups are then moved away from each other which allows the spherical fruit meat chunk to fall into a collection vessel while the two peel halves remain grasped by the rotating cups. A reaming element is inserted between the cups before the cups are again moved toward each other such that the inner surface of the peel halves comes into contact with the reaming element. The reaming element scrapes away the fruit meat remaining within the peel which is also collected.

In another particularly preferred embodiment of the present invention, a loading mechanism feeds individual fruits into an extraction apparatus that includes dual concentric turrets that index matched resilient cups between a loading station, a grooving station, a coring station, and a reaming station. The grooving station, coring station, and reaming station include a grooving element, coring element, and reaming element, respectively, that are essentially the same as those used in the single station extraction apparatus. In yet another particularly preferred embodiment of the present invention, the extraction apparatus includes a continuous motion turret that continuously moves fruits from a loading station, past an externally mounted grooving station where an equatorial groove is cut in each fruit's peel, and then cores and reams the peels by means of mechanisms that are mounted on and move with the continuously moving turret.

BRIEF DESCRIPTION OF THE DRAWINGS

While the specification concludes with claims that particularly point out and distinctly claim the subject matter regarded as forming the present invention, it is believed that the invention will be better understood from the following detailed description with reference to the drawings in which:

FIG. 5 is an enlarged schematic, perspective view of the four-bar centering linkage and brake components of the extraction apparatus illustrated in FIG. 1;

FIG. 9A is an enlarged schematic perspective view of another coring blade element used in the coring mechanism component of the extraction apparatus illustrated in FIG. 1;

FIG. 9B is an enlarged cross-sectional view of the coring blade element illustrated in FIG. 9A taken along section line 9B;

FIG. 10 is a simplified schematic perspective view of an indexing, dual turret extraction apparatus shown with some of its components removed or cut away for clarity;

FIG. 11 is a simplified schematic back view of the extraction apparatus illustrated in FIG. 10 again shown with some of its components removed or partially cut away for clarity;

DETAILED DESCRIPTION OF THE INVENTION

It should be noted that although the following detailed description and illustrations are specifically directed to methods of and apparatuses for extracting meat and juice from citrus fruits such as oranges, it is to be understood that the present invention may be applied with equal facility for extracting the interior meat portion of many other types of fruits and vegetables. In addition, it is to be understood that the particularly preferred turret versions of the extraction apparatuses of the present invention can be expanded to simultaneously process any number of fruits at a station, e.g., 4, 6, 12, 24, etc. However, for the sake of clarity and to avoid o redundancy, the following description and illustrations show only one fruit being processed at any given station. Finally, the apparatuses' frame, bearings, vacuum sources, pressurized air sources, timing circuitry, means for moving the apparatuses' various components and the like which must necessarily be provided with respect to the functional members of the disclosed apparatuses are not entirely shown in the Figures or described in detail in order to simplify and more clearly disclose the present invention, it being understood that such details are well within the knowledge of those skilled in the art of commercial fruit extraction machine design.

Figure 1:
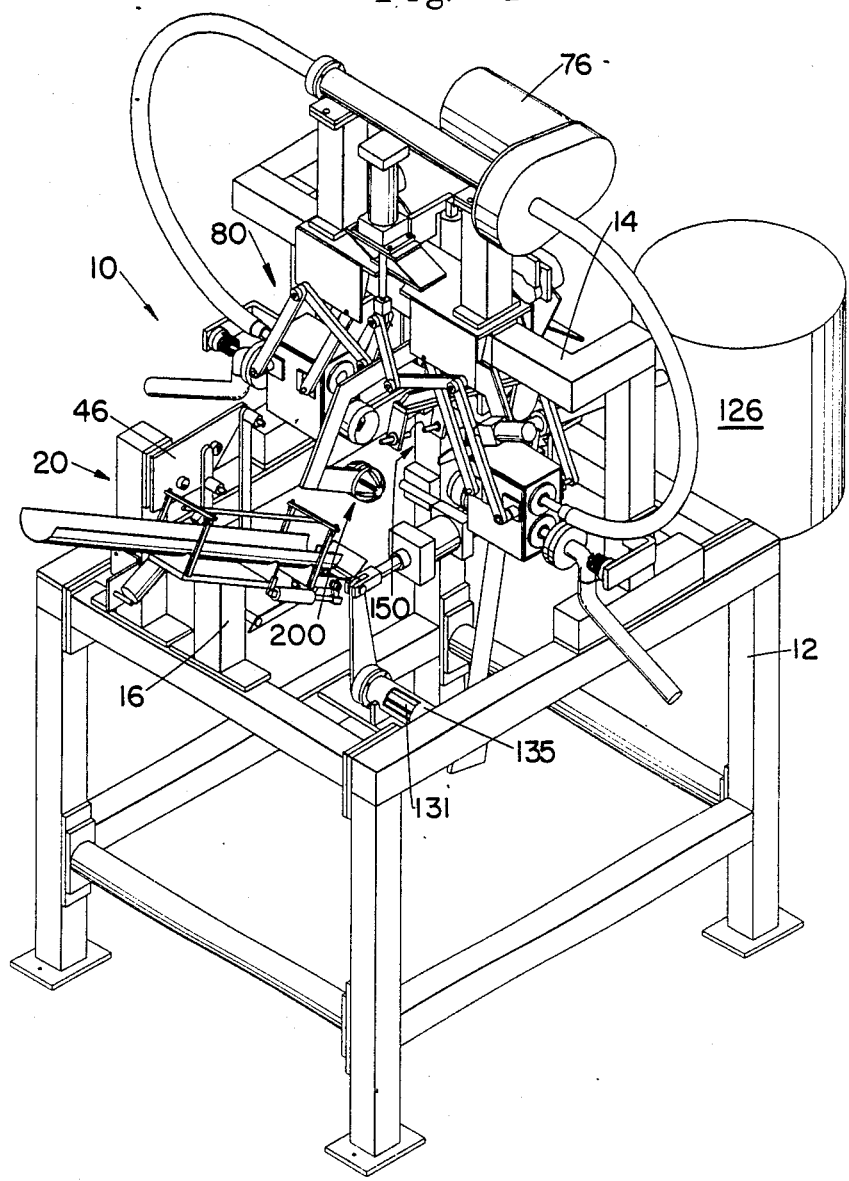
FIG. 1 is a schematic perspective view of a single station extraction apparatus used to extract a spherical chunk of fruit meat and juice from a whole fruit.
Figure 2:
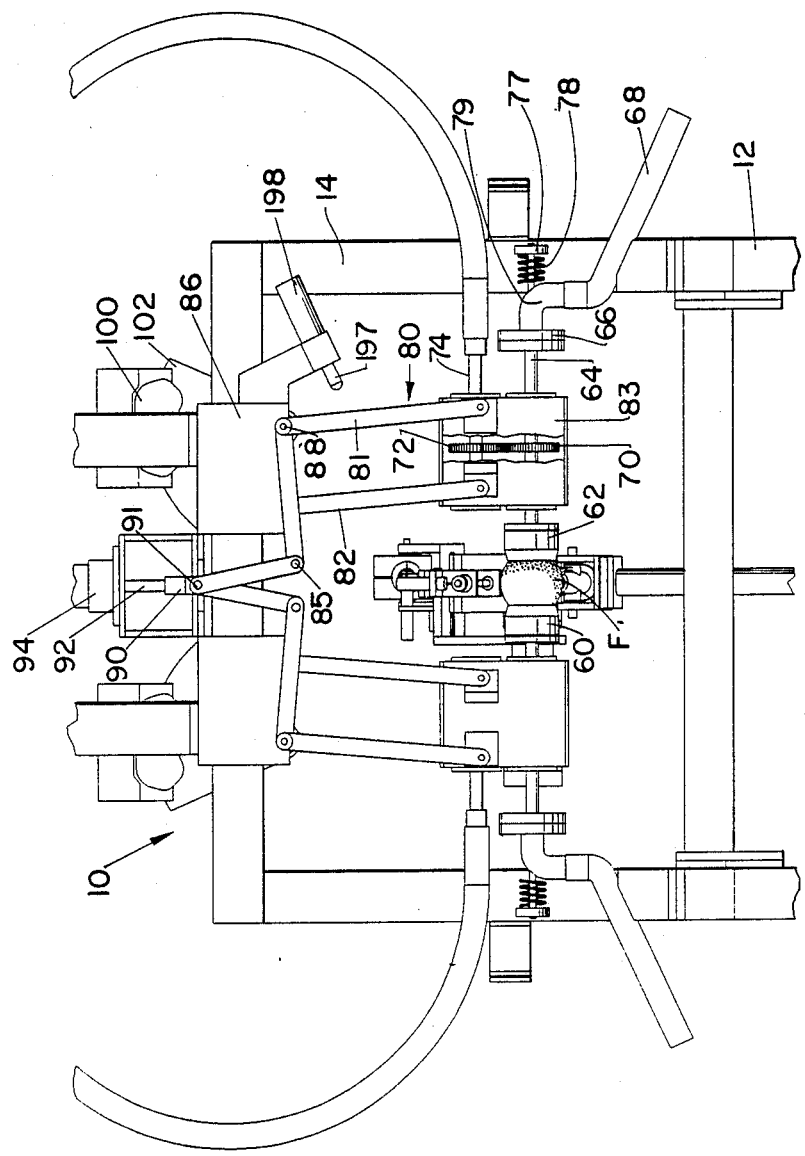
FIG. 2 is an enlarged partial schematic front view of the apparatus illustrated in Figure shown with the top and bottom portions removed and also with the apparatus's loading mechanism component removed.
Figure 3:
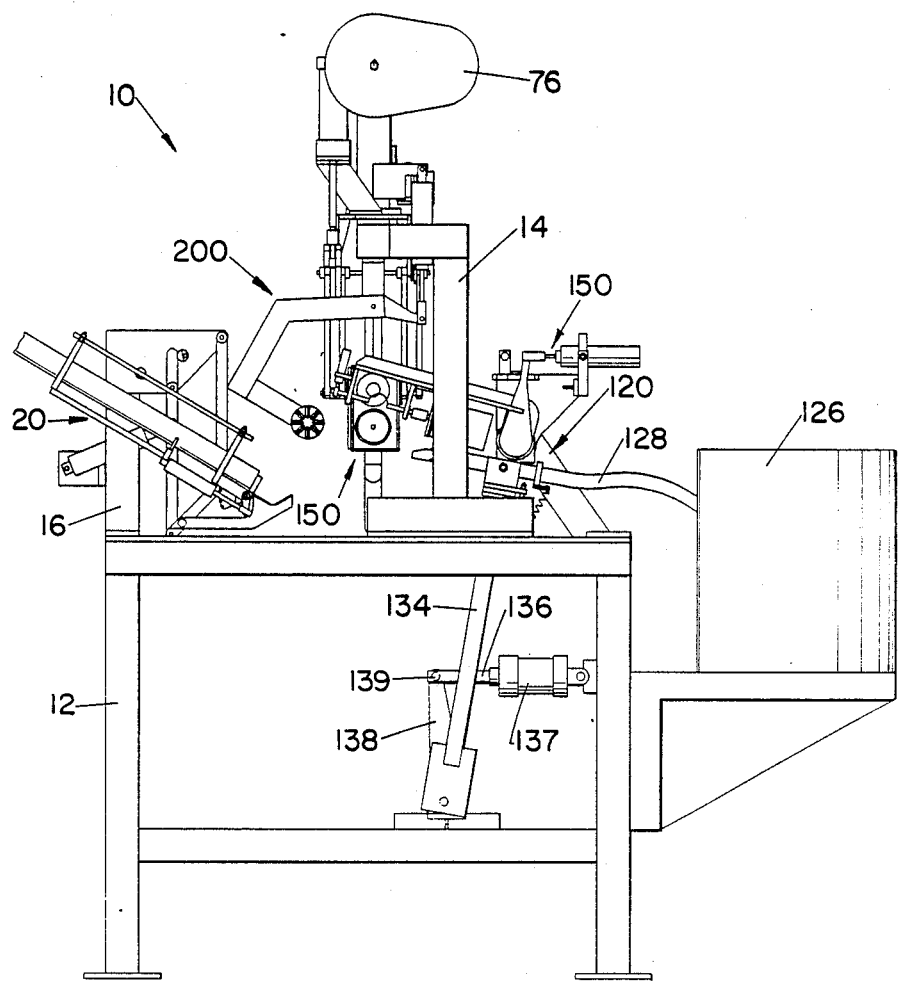
FIG. 3 is a partial schematic side view of the apparatus illustrated in FIG. 1 with the near cup, cup drive housing, and linkages associated therewith removed.
Figure 4A:
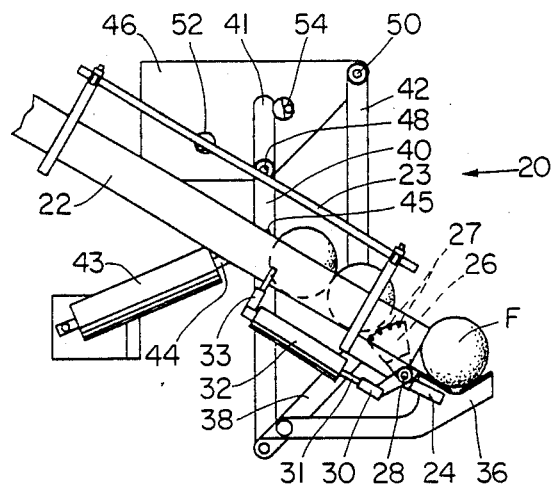
FIG. 4A is an enlarged schematic side view of the loading mechanism component used to load fruits into the extraction apparatus illustrated in FIG. 1.
Figure 4B:
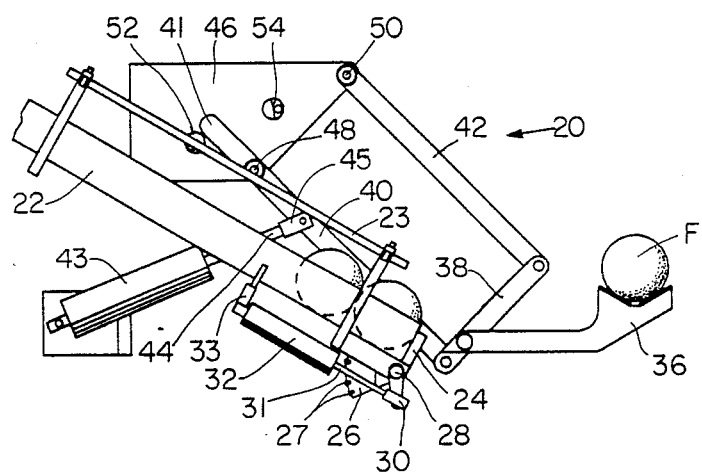
FIG. 4B is an enlarged schematic side view of the loading mechanism component used to load fruits into the extraction apparatus illustrated in FIG. 1, shown in the process of loading a fruit.

With reference to the drawings wherein the same numeral is used to indicate common apparatus and workpiece components, FIGS. 1 2, and 3 show various views of a single-station extraction apparatus generally indicated as 10 that includes lower frame 12 and upper frame 14 that are preferably constructed of 3 inch by 3 inch 7.6 cm × 7.6 cm extruded mechanical tubing such as welded stainless steel. A loading mechanism, which is generally indicated as 20 and shown in greater detail in FIGS. 4A and 4B, is attached to lower frame 12 with support 16 at the front portion of apparatus 10 and provides a means of loading fruits F one-by-one into extraction apparatus 10. It is particularly significant that loading mechanism 20 does not orient fruit F in any particular fashion with respect to its stem.

Before fruits F are placed onto chute 22 of loading mechanism 20, they are preferably cleaned and separated into groups according to size. For example, in the case of oranges, it has been found that best results are obtained if the oranges are separated into groups in which the outer diameter of the fruits do not vary by more than ½ inch 1.3 cm. The different sized groups are preferably processed by extraction apparatuses that have correspondingly sized cups, coring elements, and reaming elements as will be more thoroughly explained hereinafter. Fruits F can be cleaned by using any one of several fruit cleaning methods well known to those skilled in the fruit processing industry.

Referring to FIGS. 4A and 4B in conjunction with FIG. 1, loading mechanism 20 includes chute 22, stop bar 24, and stop roller plate 26, the latter preferably being provided with a plurality of rollers 27 along its peripheral edge. Stop pin 24 and stop plate 26 are attached to one another at approximately right angles and are pivotally mounted to chute 22 with pin 28. Clevis 30 connects both stop pin 24 and stop plate 26 to shaft 31 of actuator 32 whose rear portion is pivotally attached to chute 22 with clamp 33. Actuator 32 is preferably a dual-action air cylinder that is connected to a source of pressurized air (not shown). However, as those skilled in the art will now immediately realize, actuator 32 and all other actuators to be hereinafter described can just as easily be hydraulic cylinders, solenoids, rotating cams and followers, or other equivalents thereof.

Loading mechanism 20 also includes V-block arm 36 that is fixed to linkage 38 which is part of a four-bar linkage that includes linkage 38, linkage 40, and connecting linkage 42. Linkages 40 and 42 are pivotally attached to plate 46 at pivot joints 48 and 50, respectively. Shaft 44 of actuator 43 is pivotally attached to linkage 40 with clevis 45. End portion 41 of linkage 40 extends between stops 52 and 54 which project outwardly from plate 46.

In operation, fruit F is loaded into apparatus 10 by first sending a signal to actuator 32 to pull shaft 31 and clevis 30 inward which rotates stop bar 24 downward and allows fruit F to drop down into V-block 36 as shown in FIG. 4A. When stop bar 24 swings downward in this fashion, stop roller plate 26 rotates upward (shown in phantom in FIG. 4A) through a narrow slot in the bottom of chute 22 to block off the remaining fruits and momentarily prevent them from rolling down chute 22. Rollers 27 mounted along the peripheral edge of stop plate 26 allow it to slide along the fruit in contact therewith with minimal friction and without lifting the fruit up and out of chute 22. In addition, chute 22 can be provided with overhead bar 23 to prevent a fruit from accidentally being lifted out of chute 22 by the motion of stop roller plate 26.

After fruit F has dropped into V-block 36, a signal is sent to actuator 32 to extend shaft 31 and clevis 30 outward which rotates stop bar 24 and stop plate 26 back to their original positions. The next fruit F rolls down chute 22 to stop bar 24 and is now ready to be loaded into V-block 36 at the beginning of the next cycle.

After first fruit F has dropped into V-block 36, a signal is sent to actuator 43 to extend shaft 44 which pivots linkages 40 and 42 about their respective pivot joints 48 and 50 until end portion 41 of linkage 40 hits stop 52. This movement of linkages 38, 40, 42 swings V-block 36 carrying fruit F upward and away from the end of chute 22 as shown in FIG. 4B. When V-block 36 is in this position, it places fruit F between resilient cups 60 and 62, which are identical and have the same drive means, vacuum source connections, and positioning means; accordingly, these components associated with cup 62 only will be hereinafter described.

Returning to FIG. 2, cup 62 is mounted on one end of hollow shaft 64, the other end of which terminates within rotary vacuum manifold 66. Rotary vacuum manifold 66 is connected to a source of vacuum (not shown) via vacuum line 68. Hollow shaft 64 supplies the interior cavity of cup 62 with vacuum to enable cup 62 to firmly grasp fruit F. Cup 62 and hollow shaft 64 are rotated by a drive train that includes, for example, pinion gear 70 attached to shaft 64, drive gear 72, flexible drive shaft 74, and motor 76 (FIG. 1). Cups 60 and 62 are preferably rotated at between 200 and 2000 r.p.m., most preferably at 900 r.p.m., during the grooving, coring, an reaming operations to be hereinafter described. Ejection rod 77, which is spring-loaded with spring 78, passes through hollow shaft 64 and has one end that terminates at the base of the interior cavity of cup 62 with the other end slidably extending out through a gasketed aperture in elbow 79 of vacuum line 68. Ejection plate 75 is attached to upper frame 14 and located such that ejection rod 77 will bump into it when cup 62 is moved to its fully opened position.

Cups 60 and 62 have interior cavities that are shaped complementary to the exterior size and shape of fruit F to provide a snug fit therebetween. Cups 60 and 62 are preferably made of a resilient material such as elasticized polyvinyl chloride (PVC) or Viton Fluoroelastomer so that the cups will yield and conform to the fruit's outer dimension and form a seal therebetween that is preferably capable of maintaining the vacuum supplied to the cup's interior cavity.

Referring to FIG. 5 in conjunction with FIGS. 1 and 2, resilient cups 60 and 62 are moveable from their open, loading position as shown in FIG. 1 to their closed, coring position as shown in FIG. 2 by using, for example, a dual four-bar centering mechanism that is generally indicated as 80. Centering mechanism 80 includes L-linkage 81 and stabilizing linkages 82, the lower ends of which are pivotally attached to cup gear drive housing 83. The upper end of L-linkage 81 is pivotally attached to drive linkage 84 at joint 85 while the upper ends of stabilizer linkages 82 are pivotally attached to fixed front plate 86 with pin 87. L-linkage 81 rotates about pivot joint 88 which is also attached to front plate 86. Drive linkage 84 is pivotally attached to clevis 90 at pivot joint 91. Clevis 90 is attached to the end of shaft 92 of actuator 94.

Four-bar centering mechanism 80 also includes a brake assembly that includes caliper 100, disc 102, and brake linkage 104. Disc 102 and the upper end of brake linkage 104 are rigidly attached to one another and pivot about pin 106 which is journaled through upper frame 14. The lower end of brake linkage 104 is pivotally attached to cup gear drive housing 83.

In operation, after fruit F has dropped into V-block 36 and V-block 36 has been extended such that fruit F is positioned between cups 60 and 62 as described earlier herein, a signal is sent to actuator 94 to draw shaft 92 inward which pulls clevis 90 and attached drive linkages 84 upward. The upward movement of linkage 84 pivots L-linkages 81 about pivot joint 88 and swings cup drive housings 83 inward toward each other until cups 60 and 62 resiliently engaged and firmly grasp fruit F therebetween. In addition, the vacuum supplied to the interior cavities of cups 60 and 62 via hollow drive shaft 64 and vacuum line 68 further aids in firmly grasping fruit F. By using four-bar centering linkage 80 having parallel linkages, cups 60 and 62 move the exact same distance toward each other such that fruit F is centered with respect to the grooving, coring, and reaming mechanisms of apparatus 10 despite relatively modest variations in the size of fruit F. By setting the pressure level of the air signal sent to actuator 94 at a predetermined level, cups 60 and 62 will exert a predetermined amount of force on fruit F that is counteracted by fruit F pushing back through four-bar linkage 80.

When fruit F is firmly grasped between cups 60 and 62, a signal is sent to caliper 100 to squeeze disc 102, which through brake linkage 104 effectively locks gear drive housings 83 and cups 60 and 62 in place to prevent cups 60 and 62 from exerting too much force on and collapsing fruit F when it is grooved and cored as will be hereinafter explained.

After fruit F is firmly grasped by cups 60 and 62, a signal is sent to actuator 43 to draw shaft 44 inward which through linkages 38, 40, and 42 returns V-block back to its original position (FIG. 4A) to receive the next fruit at the beginning of the next cycle.

Figure 6:
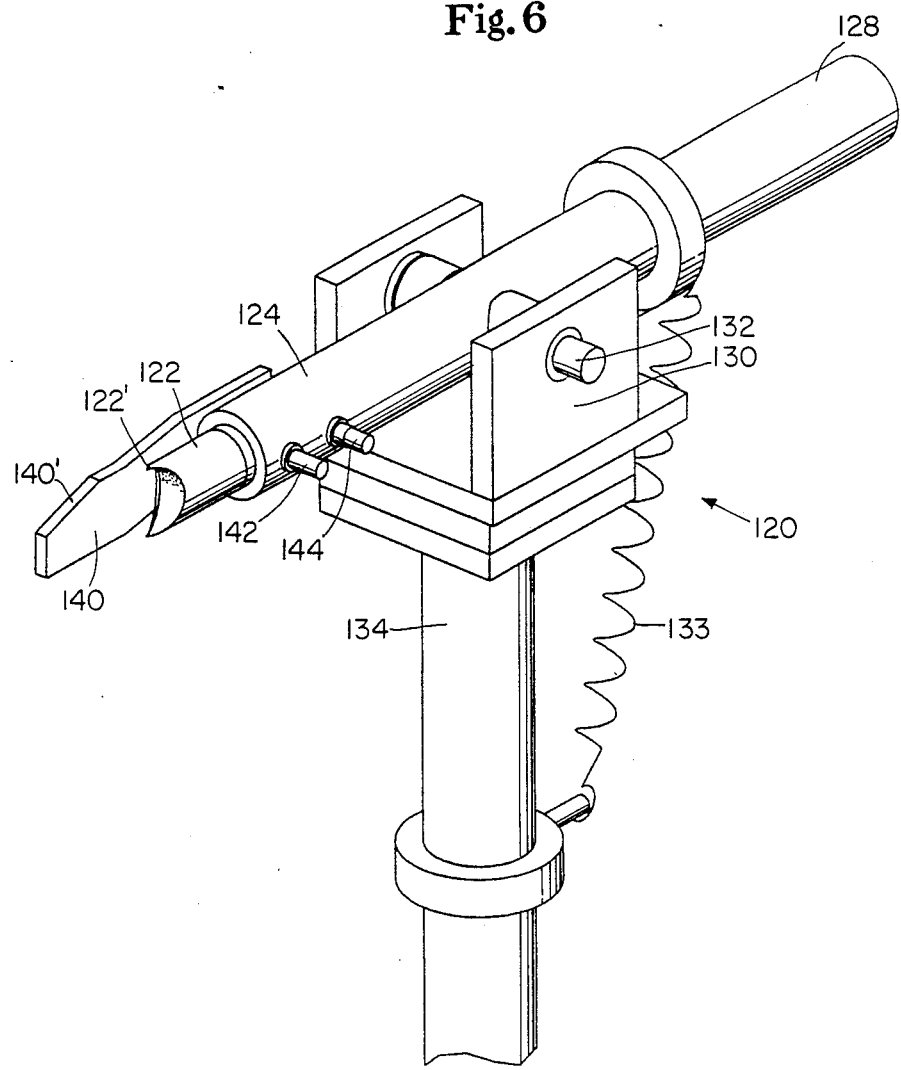
FIG. 6 is an enlarged schematic perspective view of the grooving mechanism component used in the extraction apparatus illustrated in FIG. 1.

Referring now to FIG. 6 in conjunction with FIGS. 1 and 3, a grooving mechanism generally indicated as 120 includes a hollow grooving blade 122 that passes substantially coaxially through flexible vacuum tube 124 which is connected to suction tank 126 through vacuum line 128. Vacuum tube 124 is pivotally mounted in yoke 130 with pin 132 and is spring-loaded with spring 133 such that grooving blade 122 is biased upward. Yoke 130 is mounted on top of support rod 134 whose lower end is attached to one end of shaft 131 (FIG. 1). Shaft 131 is journaled through sealed bearing tube 135 which is anchored to lower frame 12. The other end of shaft frame 131 is attached to shaft 136 of actuator 137 through lever 138 and clevis 139.

Groove depth control guide 140 is adjustably mounted on the side of vacuum tube 124 with pins 142 and 144. The distance between leading edge 140' of guide 140 and leading edge 122' of hollow grooving blade 122 is adjustable and depends on the average thickness of the peels of the fruits being grooved, which in the case of oranges is typically ⅛"-154" (3.2 mm-9.5 mm). In a particularly preferred embodiment, a second groove depth control guide is adjustably attached to the opposite side of vacuum tube 124 to provide even better control over hollow grooving blade 122.

Grooving blade 122 is preferably slidably mounted within vacuum tube 124 to enable blade 122 to be quickly removed and replaced with another blade when it becomes dull. Blade 122 is preferably made of a hardenable food grade stainless steel tube whose end is swaged into an oval shape, then machined concave into a crescent shape as shown. It has been found that this particular shape and configuration works particularly well in capturing the thin strip of peel that is removed from the fruit as it is being grooved. In addition and as is the case with citrus fruits such as oranges, it has found that this shape also captures a significant amount of peel oil mist released from the peel while it is being grooved.

In operation, after fruit F is grasped between cups 60 and 62 and rotated at preferably 900 r.p.m. as previously described, a signal is sent to actuator 137 to extend shaft 136 outward which rotates lever 138 and swings grooving mechanism 120 toward rotating fruit F, which rotates into grooving blade 122, such that leading edge 140' of groove depth control guide 140 tangentially engages the bottom surface of fruit F. As coring mechanism 120 is further moved toward fruit F, guide 140 rides up along the surface of the fruit which pivots vacuum tube 124 about pin 132 while the leading edge 122' of grooving blade 122 begins to cut a groove into the fruit's peel by cleanly removing a continuous thin strip of peel. Since vacuum tube 124 pivots about pin 132 and is biased with spring 133, groove depth control guide 140 and grooving blade 122 ride up and down along the outer surface of fruit F despite variations in the size and shape of the fruits. Vacuum supplied to hollow grooving blade 122 through vacuum tube 124, vacuum line 128, and suction tank 126 draws the peel strip away from the fruit and into tank 126 where it is collected. In addition, in the case of citrus fruits, this vacuum system also collects most of undesirable flavor components released from the peel, e.g. peel oil mist, and thus substantially prevents these components from coming into contact with and contaminating the fruit meat inside the peel or mixing with any juice released from the fruit that is collected during this grooving operation.

Figure 7:
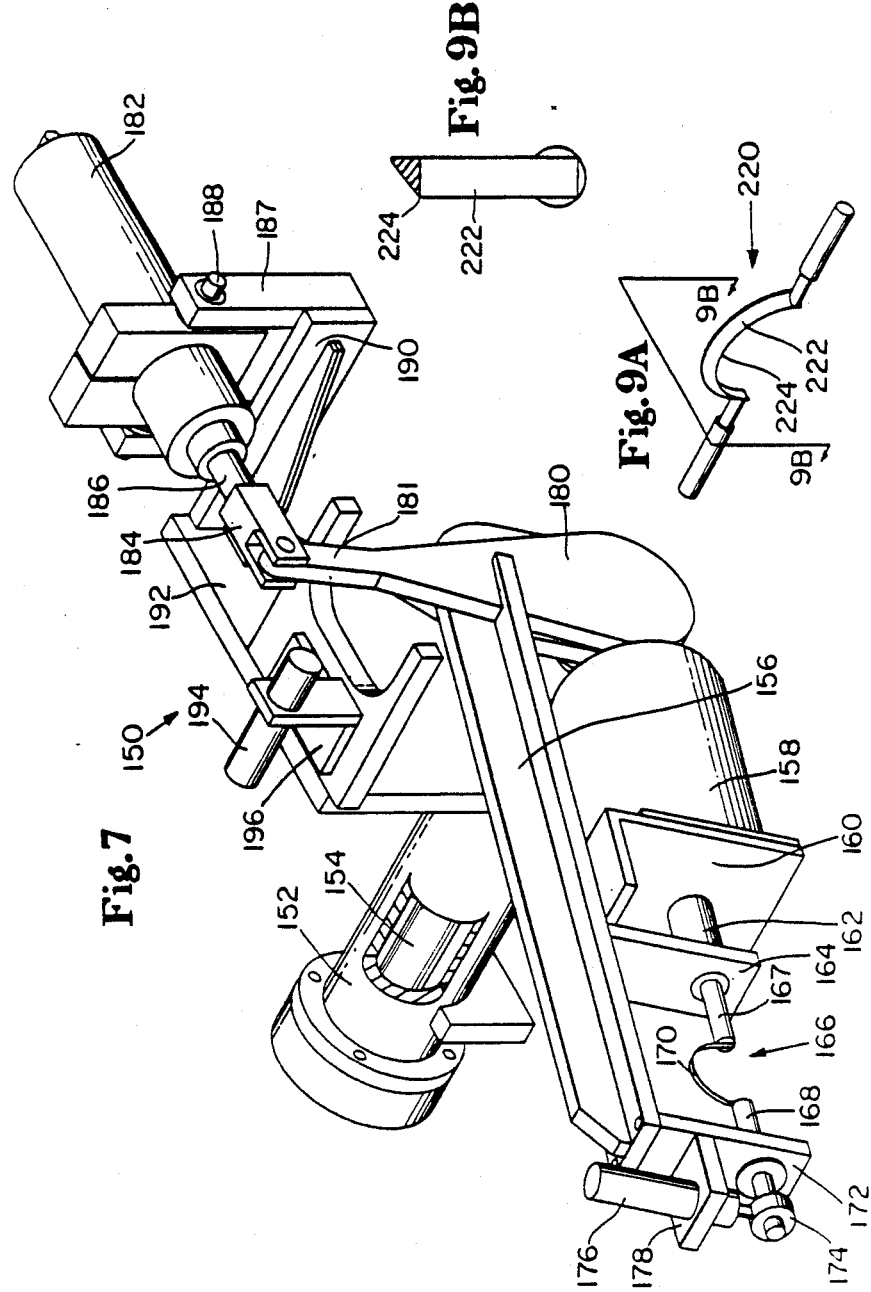
FIG. 7 is an enlarged schematic perspective view of the coring mechanism component used in the extraction apparatus illustrated in FIG. 1.

Once fruit F has been grooved, a signal is sent to actuator 137 to retract shaft 136 which swings grooving mechanism 120 back to its original position. Immediately thereafter, a coring mechanism is used to extract a spherical chunk of fruit meat from the fruit's peel. Referring to FIG. 7 in conjunction with FIGS. 1 and 3, a coring mechanism generally indicated as 150 is grounded to upper frame 14 and includes sealed bearing tube 152 having a rotatable pivot shaft 154 internal thereto. Swing arm 156 is attached to the end of pivot shaft 154 and has stepper motor 158 mounted thereon with bracket 160. Output shaft 162 of stepper motor 158 is journaled through a bearing in support bracket 164 and is coupled to a coring element generally indicated as 166. Coring element 166, which is preferably made of hardenable food grade stainless steel, includes shaft portions 167 and 168 with sharp semicircular blade 170 bridging the two. Blade 170 has a diameter that is slightly smaller, e.g., 0.25 inches 0.64 c.m. smaller, than the inner diameter of the peel of the smallest fruit being processed. Shaft portion 167 is coupled to output shaft 162 of stepper motor 158 while shaft portion 168 is journaled through a bearing in bracket 172. Sensor disk 174 is keyed to the end of shaft portion 168 directly beneath sensor 176 which is carried by bracket 178.

Lever arm 180 is also attached to pivot shaft 154 and is fixed to swing arm 156 at approximately a right angle. Upper portion 181 of lever arm 180 is coupled to actuator 182 through clevis 184 which is attached to shaft 186 of actuator 182. Actuator 182 is pivotally mounted within yoke 187 through pin 188 and supported by bracket 190 which is attached to plate 192. Magnetic field sensor 194 is supported by bracket 196 which is attached to plate 192. Sensor 194 is positioned such that its field of view senses the presence or absence of upper portion 181' of lever arm 180.

In operation, after an equatorial groove has been cut in the outer peel of fruit F as hereinbefore described, a signal is sent to actuator 182 to extend shaft 186 and clevis 184 which rotates lever arm 180 forward and lowers swing arm 156 such that sharp semicircular blade 170 of coring element 166 passes into the equatorial groove cut in fruit F. Sensor 194 verifies that upper portion 181 of lever arm 180 has fully swung forward which also verifies that semicircular blade 170 is properly seated within the equatorial groove in the fruit's peel and isn't hung up somewhere on the peel's ungrooved portion. If sensor 194 does not verify that lever arm 180 has moved fully forward, the apparatus goes into shut-down mode until an operator can clear the jam.

Once semicircular blade 170 is seated within the groove, a signal is sent to stepper motor 158 to rotate coring element 166 360°, which coupled with fruit F being rotated by cups 60 and 62 cleanly severs a spherical chunk of fruit meat from the fruit's peel. Sensor 176 monitors the location of sensor disk 174 to verify that coring element 166 has indeed rotated 360° and has not been jammed by the fruits sectional membranes. If sensor 176 does not verify that coring element 166 has rotated 360°, the apparatus goes into shut-down mode until an operator can clear the jam and restart the apparatus.

When sensor 176 verifies that coring element 166 has returned to its original vertical position such that semicircular blade 170 is again aligned with the groove in the fruit's peel, a signal is sent to actuator 182 to draw shaft 186 inward which pulls lever arm 180 back and lifts swing arm 156 and coring element 166 back to their original position.

Referring back to FIGS. 1 and 2, when coring element 166 has been fully retracted as verified by magnetic field sensor 194, disc brake caliper 100 is deactivated and a signal is sent to actuator 94 to extend shaft 92 which pushes dual four-bar centering linkage 80 open which moves cups 60 and 62 away from each other, each cup now carrying a substantially empty half fruit peel. At the same time, a signal is sent to actuator 198 to extend stop shaft 197 which prevents L-linkage 81 and therefore four-bar centering linkage from returning to their fully-opened, original position. When cups 69 and 62 are partially retracted in this manner, the extracted spherical fruit meat chunk tumbles out from between the two peel halves and falls down into a collection vessel (not shown) along with any juice that was released from the fruit during the coring process.

As previously noted herein, coring blade 170 is sized to correspond to a particular size range of fruits to be cored. Preferably, coring blade 170 is just slightly smaller than the inner diameter of the peel of the smallest fruit to be processed to insure that preferably little or no inner peel material is removed with the fruit meat. Therefore, some fruit meat will occasionally remain attached to the inner surface of the fruit's peel after the coring operation is complete. As further noted previously herein, extracting the maximum amount of juice and fruit meat from a fruit is critically important in a commercial operation; therefore, the fruit meat and juice remaining within the peel are preferably extracted by using, for example, a reaming mechanism.

Figure 8:
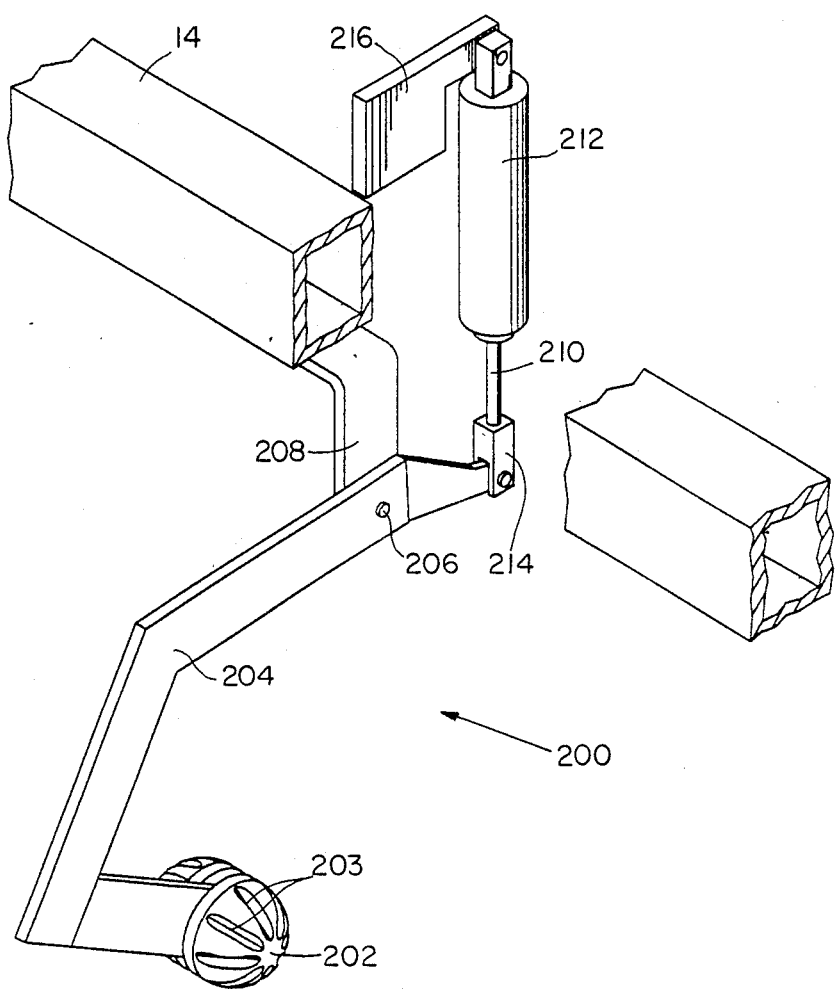
FIG. 8 is an enlarged schematic perspective view of the reaming mechanism component used in the extraction apparatus illustrated in FIG. 1.

Referring to FIG. 8 in conjunction with FIGS. 1 and 3, a reaming element generally indicated as 200 includes reaming head 202 that is removably attached to the end of L-shaped arm 204. L-Shaped arm 204 is pivotally attached with pin 206 to bracket 208 which is welded or otherwise fixed to upper frame 14. The other end of L-shaped arm 204 is pivotally attached to shaft 210 of actuator 212 with clevis 214. The upper end of actuator 212 is pivotally attached to mounting bracket 216 which is also attached, e.g., welded, to upper frame 14.

Reaming head 202 is preferably made of a rigid material such as food-grade stainless steel or a food-grade plastic and has a diameter approximately the same size as the average inner diameter of the fruit peels to be reamed. Reaming head 202 is also preferably provided with a plurality of valleys 203 in its outer surface which provide scraping edges to remove the fruit meat remaining on the inner surface of the peel halves and also a place for juice and fruit meat to momentarily channel and collect while the peel halves are being reamed.

In operation, after actuator 94 has moved cup 60 and 62 with their grasped peels away from each other, a signal is sent to actuator 212 to draw shaft 210 inward which pivots L-shaped arm 204 about pin 206 and swings reaming head 202 into place between rotating cups 60 and 62. A signal is then sent to actuator 94 to again move cups 60 and 62 inward toward each other as previously described such that the half fruit peels engage reaming head 202. The rotation of cups 60 and 62 coupled with the force exerted by actuator 94 through four-bar centering linkage 80 causes reaming head 202 to gently scrape away the fruit meat remaining within the peel halves. Since the vast majority of the fruit meat and sectional membranes were extracted from the peel during the coring operation, only very slight pressure is required to scrape the fruit meat from the peel and therefore, very little or no undesirable flavoring components are squeezed from the peel and very little or no membrane sections remaining on the peels' inner surface are dislodged or shredded. The fruit meat and juice extracted during this reaming operation fall downward into a collection vessel not shown.

Referring again to FIG. 2, after the fruit peel halves have been reamed, a signal is sent to actuator 94 to again move cups 60 and 62 away from each other. At the same time, a signal is sent to actuator 198 to draw stop shaft 197 inward which allows four-bar centering mechanism 80 to swing to its fully-open position such that spring-loaded ejection rod 77 bumps into ejection plate 75 and ejects the empty peels from rotating cups 60 and 62. Shortly thereafter, loading mechanism 20 positions another fruit between cup 60 and 62 to begin the next extraction cycle.

In another particularly preferred embodiment of the present invention and with reference to FIGS. 9A and 9B, reaming element 200 is eliminated entirely from apparatus 10 and replaced by a coring/reaming element generally indicated as 220 in coring mechanism 150. Coring/reaming element 220 is in all respects identical to previously-described coring element 166 used in coring mechanism 150 with the exception that sharp blade section 222 of element 220 is provided with a generally triangular cross-section that includes sharp leading edge 224 and trailing edge 226 as can be best seen in FIG. 9B. Leading edge 224 of sharp blade section 222 cleanly severs the fruit meat from the peel when coring/reaming element 220 is rotated 360° while the relatively soft peel and resilient cups 60 and 62 flex to accommodate trailing edge 226 which wipes the fruit meat and juice from the peel's inner surface. It has been found that best results are obtained if the diameter of trailing edge 226 is approximately 0.38 inches (0.97 cm) larger than the diameter of sharp leading edge 224. For example, in processing oranges having an inner peel diameter in the 2.75-3.25 inch (7.0-8.25 cm.) group size range, leading edge 224 has diameter of 2.5 inches (6.4 cm.) while trailing edge 226 has a diameter of 2.88 inches (7.3 cm.).

In another preferred embodiment of the present invention, grooving mechanism 120 is eliminated and cutting an equatorial groove in the outer peel of the fruits is performed by a grooving/coring mechanism. Referring to FIG. 7, the bottom edges of shaft portions 167 and 168 of coring blade 166 are sharpened so that when coring mechanism 150 is lowered into the rotating fruit, the sharpened bottom edges of shaft portions 167 and 168 first come into contact with the fruit's peel and slice a groove into the peel. However, it has been found that this version of the present invention releases a substantial amount of peel oil from the peel that can contaminate the fruit's inner meat section and is therefore less preferred than the previously-described version that includes a separate grooving step and grooving mechanism.

The scope of the present invention also contemplates using fluid jets instead of a mechanical reaming element to gently remove the fruit meat and juice remaining within the peel of the fruit has been cored. As noted previously herein, fluid jets have been met with little commercial success because in the case of a citrus fruit such as oranges, the inner sectional membranes (rag) tend to fold over onto one another and block the fluid's ability to reach the fruit meat located deep within the peel. However, since the present extraction method and apparatus effectively removes the vast majority of the fruit's meat and rag in the form of a spherical meat chunk, a fluid jet will work very well in scouring the remaining meat from the peel. Examples of fluid jet extractors that can be attached to the end of L-shaped arm 204 in lieu of reaming head 202 include those generally described in U. S. Pat. Nos. 4,294,861 and 4,300,448, which are incorporated herein by reference.

Referring now to FIGS. 10 and 11, there are shown various views of an indexing turret extraction apparatus generally indicated as 250 with each view having some of the apparatus' components removed or partially cut away to show greater detail. Extraction apparatus 250 uses many of the same basic components and mechanisms that are found in previously-described extraction apparatus 10 and performs basically the same operations, i.e., grooving, coring, and reaming of fruits, one of the main differences between the two apparatuses being that apparatus 250 is capable of operating at a much higher production rate.

Referring first to FIG. 10, turret extraction apparatus 250 includes right turret generally indicated as 252 and left turret generally indicated as 254 that are both attached to main turret drive shaft 256. Right turret 252 and left turret 254 include outer casings 258 (shown partially cut away) and 260, respectively, which protect each turret's internal cup drive in lateral motion mechanisms from extracted juice and cleaning solutions. Main turret drive shaft 256 is journaled through pillow block bearings 262 and 263 that are mounted on horizontal support plates 264 and 265, respectively, which are supported by a plurality of vertical floor supports 266.

Turret drive shaft 256 and attached right and left turrets 252, 254 are indexed between loading station L, grooving station G, coring station C, and reaming station R by a drive train that includes motor 266, gear reducer 268, indexer 270 (one index equals 90° rotation), drive gear 272, overload clutch 274, and pinion gear 276 that is keyed or otherwise fixed to turret drive shaft 256.

Turrets 252 and 254 each carry four resilient cups 280-287 that are essentially identical to the resilient cups of apparatus 10 described earlier herein. Referring to FIG. 11 to describe only one cup in detail, cup 281 is mounted on one end of hollow cup drive shaft 290 which is journaled through bearings in cup carriage assembly 292 which is supported by disks 292 and 294. The interior of cup 281 (and similarly the other seven cups) is supplied with vacuum via vacuum line 296 and hollow cup drive shaft 290 in order to firmly grasp a fruit during the cycle of operations.

As with the resilient cups associated with previously-described apparatus 10, cups 280-287 are rotated during the grooving, coring, and reaming operations. Cups 280-283 of turret 254 are rotated by a drive train that includes motor 300, pinion gear 302 mounted on the output shaft of motor 300, gear 304 mounted on the end of idler shaft 305 passing through bearing tube 306, universal joint 308, torque tube 310, universal joint 312, idler shaft 313 passing through bearing tube 314, pulley 316 mounted on the end of idler shaft 313, belt 318, pulley 320, idler shaft 319 passing through bearing tube 322, gear 324 mounted on the end of idler shaft 319, ring pinion gear 326, ring drive gear 328 which is attached to ring pinion gear 326, and finally cup drive gear 330 which is mounted on an internal spline on the cup drive shaft associated with the respective cup 280-283, e.g., cup drive shaft 290 for cup 281. Similarly, cups 284-287 of turret 252 are rotated by a drive train that includes motor 300, pulley 332 mounted on the other end of idler shaft 306, belt 334, pulley 336, idler shaft 337 which passes through bearing tube 338, pinion gear 340, ring pinion gear 342, ring drive gear 344 which is attached to ring pinion gear 342, and finally cup drive gear 346 which is mounted on an internal spline on the cup drive shaft associated with the respective cup 284–287, e.g., drive shaft 291 for cup 284.

As also with the cups associated with previously-described apparatus 10, resilient cups 280–287 of apparatus 250 are laterally movable from an open, loading position to a closed, locked position with a fruit grasped thereinbetween. Still referring to FIG. 11, each pair of matched resilient cups, e.g., 281 and 284, have associated therewith a lateral motion mechanism (only one being shown) that includes actuator 340, shaft 342, clevis 344, and link arm 346 pivotally attached to clevis 344. The upper end of link arm 346 is pivotally attached to cup carriage assembly 292 while the lower end of link arm 346 is pivotally attached to one end of connecting link 348. The other end of connecting link 348 is pivotally attached to the lower end of link arm 350 while the upper end of link arm 350 is pivotally attached to cup carriage assembly 293. Finally, link arms 346,350 have associated therewith disk brakes 352,354, respectively, which when activated limit the distance that cups 281,284 can be moved toward one another and secure the cups in a locked position.

In operation and with reference to both FIGS. 10 and 11, a fruit is loaded into apparatus 250 by loading mechanism generally indicated as L, which is essentially identical to loading mechanism 20 of previously-described apparatus 10. Briefly, loading mechanism L extends its lower V-block, which holds a fruit, outwardly such that the fruit is positioned between two matched resilient cups. Once the fruit is so positioned, a signal is sent to actuator 340 to extend shaft 342 and clevis 344 which through link arm 346 moves cup 281 toward the fruit. Simultaneously, connecting link 348 pivots link arm 350 such that resilient cup 284 is also moved toward the fruit. Actuator 340 continues this motion until the fruit is firmly grasped between matched resilient cups 281 and 284. Once the fruit is firmly grasped by the cups, a signal is sent to disk brakes 352 and 354 to lock link arms 346 and 350 in this position.

After the fruit has been firmly grasped between resilient cups 281 and 284 and the cups' lateral locations are locked, right turret 252 and left turret 254 are simultaneously indexed 90° which swings the cups and the fruit into grooving station generally indicated as G and also swings the next set of cups into loading station L to receive the next fruit. Grooving station G includes a grooving mechanism 360 that is essentially identical to grooving mechanism 120 of previously described apparatus 10. Briefly, while the fruit is being rotated by the cup rotating drive train previously described, a signal is sent to actuator 362 to retract its shaft 364 which pivots grooving mechanism 360 such that the grooving blade comes into tangential contact with the rotating fruit, which cuts an equatorial groove in the fruit's outer peel in the same manner as previously described.

After the fruit has been grooved and grooving mechanism 360 has been retracted, turrets 252 and 254 are indexed another 90° which places the grooved fruit into the coring station generally indicated as C. Coring station C includes a coring mechanism 365 that is essentially identical to coring mechanism 150 of apparatus 10. Briefly, coring mechanism 365 is pivoted upwardly until its hemispherical coring blade is seated within the equatorial groove cut in the fruit. When the coring blade is properly seated as verified by sensors, the blade is rotated 360°, which coupled with the fruit being rotated by cups 281 and 284, cleanly severs a spherical chunk of fruit meat from the fruit's peel.

After a spherical chunk of fruit meat has been separated from the fruit's peel, brakes 352 and 354 are deactivated while a signal is sent to actuator 340 to retract shaft 342 which through link arms 346 and 350 moves resilient cups 281 and 284 away from one another. In the process, the extracted chunk of fruit meat falls into a hopper located beneath coring mechanism 365 (not shown) while the two peel halves remain grasped by resilient cups 281 and 284 with the aid of vacuum supplied to their interior cavities.

After the coring operation is complete, turrets 252 and 254 are indexed 90° such that cups 281 and 284 with their grasped, substantially empty peel halves stop adjacent to reaming station generally indicated as R. Reaming station R includes support 370 (shown partially cut away) that carries reaming element 372 which is essentially identical to reaming element 200 associated with previously-described apparatus 10. When cups 281 and 284 are positioned adjacent to reaming element 372, a signal is sent to actuator 340 to again close cups 281 and 284 such that the interior surface of the peel halves comes into gentle contact with reaming element 372. The continuing rotation of cups 281 and 284 coupled with the gentle force exerted by actuator 340 causes reaming element 372 to gently scrape away the fruit meat remaining within the peel halves. This fruit meat and any released fruit juice fall downward into a collection hopper located below reaming element 272 (not shown).

After the peel halves have been reamed, the cups are moved away from each other and turrets 252 and 254 are indexed 90° to start the next cycle. While traveling between reaming station R and loading station L, cups 281 and 284 pass by knockoff bars (not shown) which strip the now empty peel halves from the cups.

As with previously-described apparatus 10, reaming station R can be eliminated in apparatus 250 and a wedge-shaped coring blade essentially identical to the one shown in FIGS. 9A and 9B can be used in coring mechanism 365 to simultaneously core and ream the fruit. Alternatively, fluid jets directed into the peel halves can be mounted on reaming support 370 instead of reaming element 372 to gently remove the fruit meat and juice remaining within the peel. As noted previously herein, fluid jets have met with little commercial success because in the case of a citrus fruit such as oranges, the inner sectional membranes (rag) tend to fold over onto one another and block the fluid's ability to reach the fruit meat located deep within the peel. However, since the present extraction apparatus 250 effectively removes the vast majority of the fruit's meat and rag in the form of a spherical meat chunk, a fluid jet will work very well in scouring the minor portion of fruit meat remaining on the inner surface of the peel halves. Examples of fluid jet extractors that can be attached to the end of reaming support 370 in lieu of reaming element 372 include those generally described in U.S. Pat. Nos. 4,294,861 and 4,300,448, which are incorporated herein by reference.

Figure 12:
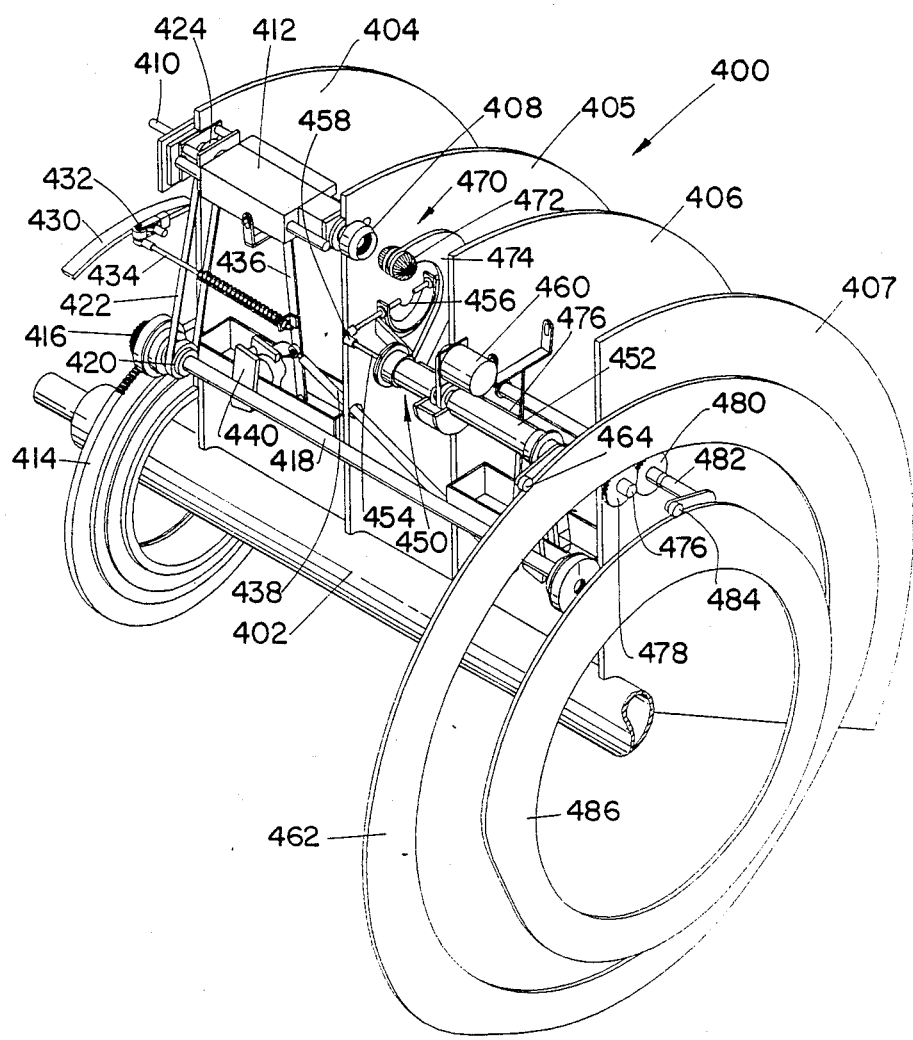
FIG. 12 is a simplified schematic perspective view of a continuous motion turret extraction apparatus shown with some of its components removed or partially cut away.
Figure 13:
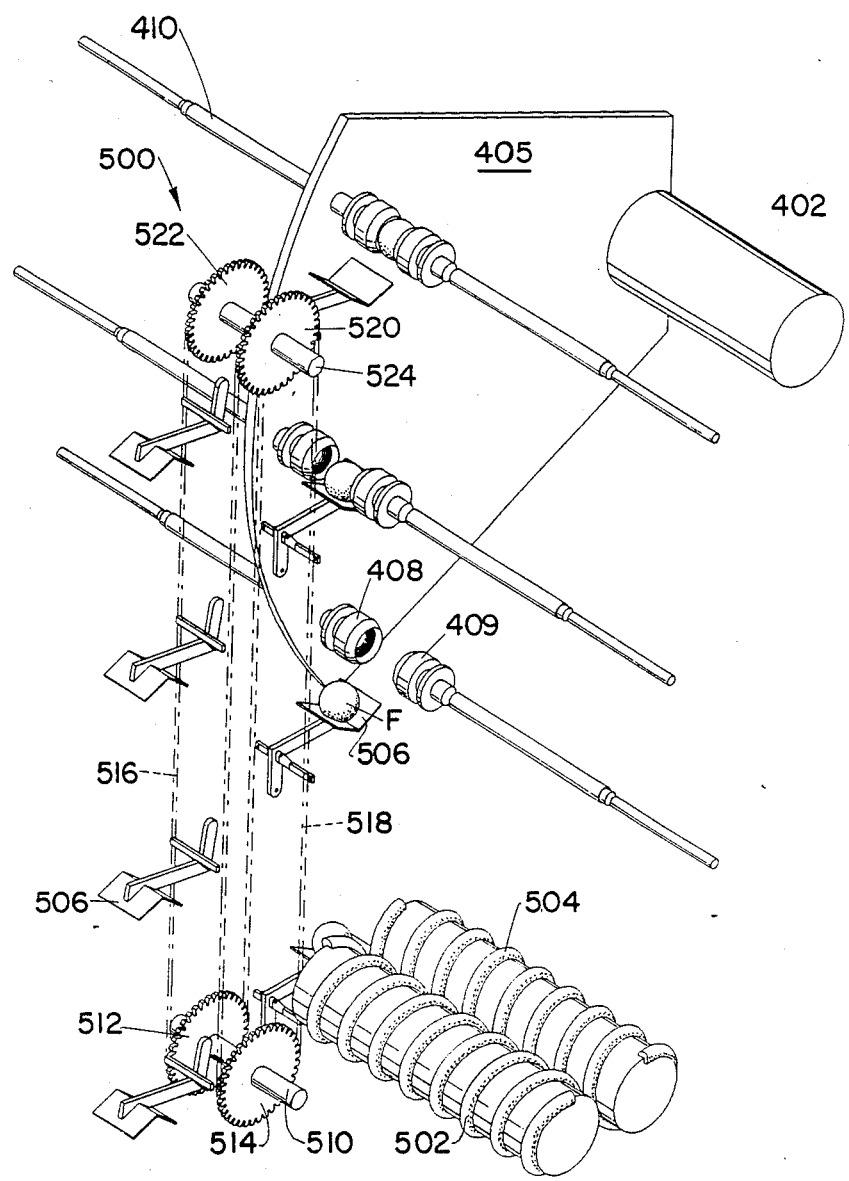
FIG. 13 is an enlarged schematic perspective view of the loading mechanism used in the extraction apparatus illustrated in FIG. 12.
Figure 14:
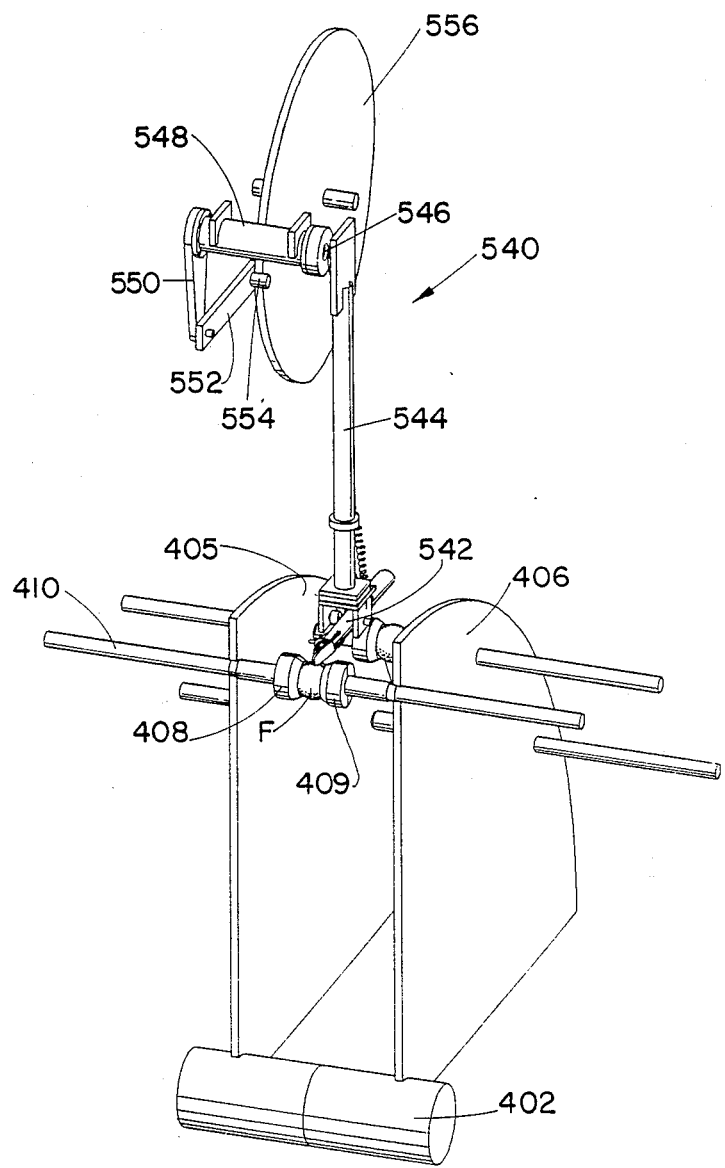
FIG. 14 is an enlarged schematic perspective view of the grooving mechanism used in the extraction apparatus illustrated in FIG. 12.
Figure 15:
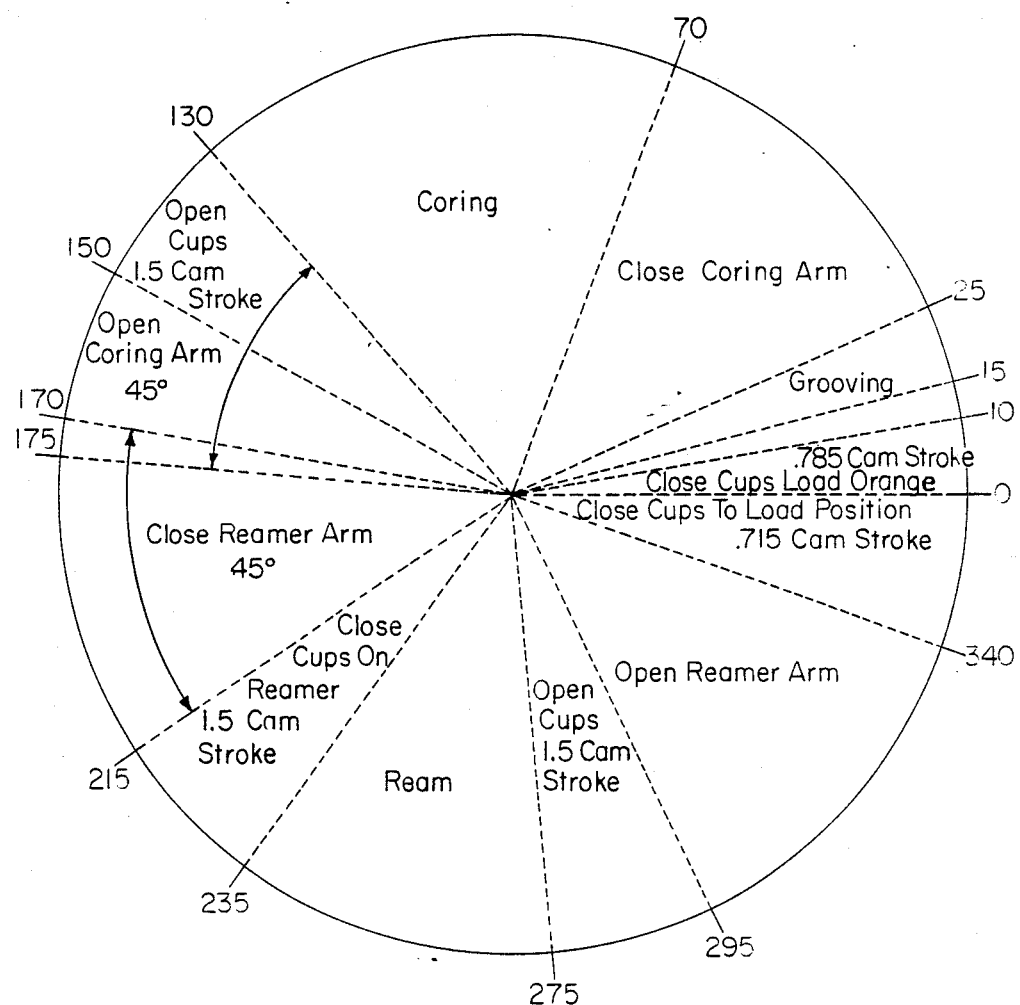
FIG. 15 is a simplified timing diagram that shows the sequence of operations performed by the extraction apparatus illustrated in FIG. 12.

FIGS. 12–14 illustrate various views of a continuous-motion extraction apparatus generally indicated as 400 that has some of its components removed or partially cut away for clarity and to show greater detail. FIG. 15 is a timing diagram that shows the sequence and dwell of the various operations which apparatus 400 performs. Apparatus 400 is a 72" (182.9 cm) pitch diameter turret having twelve stations and is capable of comfortably processing 120 fruits/minute.

Referring first to FIG. 12, apparatus 400 include main drive shaft 402 that is continuously rotated by a drive train similar to that of apparatus 250 without indexer 270. Main drive shaft 402 has mounted thereon support disks 404–407 that carry 24 cups (only cup 408 being shown) and their associated lateral motion mechanisms, coring mechanisms and reaming mechanisms.

Cup 408 is mounted on the end of hollow cup drive shaft 410 that passes through cup carriage assembly 412. As with the cups associated with previously-described apparatuses 10 and 250, cup 408 and the other 23 cups are continuously rotated by, for example, a drive train that includes drive gear 414, pinion gear 416, idler shaft 418 that extends across the apparatus to supply rotation to the opposing cups, pulley 420, belt 422, and pulley 424 mounted on hollow cup drive shaft 410 with an internal spline. As also with the cups associated with previously-described apparatuses 10 and 250, cup 408 and the other 23 cups are supplied with vacuum and are also laterally-moveable between an open, loading position and a closed position with a fruit grasped thereinbetween. The cup's laterally motion mechanism for apparatus 400 includes cam 430, follower 432, spring-loaded push rod 434, pivot arm 436 attached to cup carriage assembly 412, connecting linkage 438 attached to pivot arm 436 and a pivot arm (not shown) associated with the cup opposed to cup 408, and disk break 440.

Still referring to FIG. 12, each pair of cups has a coring mechanism generally indicated as 450 and a reaming mechanism generally indicated as 470 associated therewith. Coring mechanism 450 is mounted on the end of hollow bearing tube 452 having shaft 454 passing therethrough that rotates coring blade 456 through gears 458 driven by stepper motor 460. Cam 462 and follower 464 attached to hollow bearing tube 452 which is mounted on bearings through support disks 406 and 407 swing coring mechanism 450 back and forth between a retracted position and a coring position. Reaming mechanism 470 includes reaming head 472 mounted on the end of arm 474, the other end of which is attached to shaft 476. Gears 478, 480, shaft 482, follower 484, and cam 486 swing shaft 476 and attached reaming element 470 back and forth between a retracted position and a reaming position.

FIG. 13 illustrates a loading mechanism generally indicated as 500 that continuously loads fruits into apparatus 400. Loading mechanism 500 includes spiral advancers 502, 504 that advance fruits into the path of a plurality of V-blocks 506. V-block 506 continuously lifts a fruit up until the fruit is placed between a pair of cups 408, 409 by a drive train that includes drive shaft 510, sprockets 512 and 514, chains 516 and 518, and sprockets 520 and 522 mounted on idler shaft 524.

FIG. 14 illustrates a grooving mechanism generally indicated as 540 that is mounted external to the continuously-rotating turret of apparatus 400. Grooving mechanism 540 includes grooving element 542, which is essentially the same as the grooving elements of previously-described apparatuses 10 and 250, that is mounted on the end of swing shaft 544. Swing shaft 544 is attached to one end of shaft 546 that passes through bearing tube 548, the other end of which is attached to crank 550. Crank 550 is pivotally attached to push rod 552 that terminates with follower 554 which rides on rotating cam 556.

In operation and with reference to FIG. 15 timing diagram in conjunction with FIGS. 12-14, spiral advancers 502, 504 of loading mechanism 500 advance a fruit into the path of V-block 506 which picks the fruit up and places it between a pair of matched resilient cups 408, 409. Then, cam 430 (FIG. 12) pushes follower 432 and spring-loaded push rod 422 inward, which through swing arm 458 and connecting link 438, move carriage assembly 412 and the opposed carriage assembly with their respective cups toward one another such that the fruit is grasped therebetween. Once the fruit is grasped between the cups with the aid of vacuum, disc brake 440 is activated which locks the cups in this position.

As the turret continues to rotate, cam 556 (FIG. 14) swings the grooving blade of grooving element 542 into tangential contact with the fruit, which coupled with the rotation of cups 408 and 409 carrying the fruit, cuts an equatorial groove in the fruit's outer peel.

After the fruit's peel has been grooved and grooving element 452 retracted, cam 462 (FIG. 12) swings coring mechanism 450 upward until coring blade 456 is seated within the groove. Immediately thereafter, stepper motor 460 rotates coring blade 456 360°, which coupled with the rotation of the fruit, cleanly severs a spherical chunk of fruit meat from the fruit's peel. After the spherical chunk of fruit meat is severed from the peel, cam 462 swings coring mechanism 450 back to its original position. Immediately thereafter, brake 440 is deactivated (released) cam 430 moves cup carriage assembles 412 away from one another which allows the spherical chunk of fruit meat to fall into a collection hopper (not shown).

Further rotation of the turret swings reaming mechanism 470 into its reaming position at which time cam 430 again closes cup carriage assemblies 412 toward one another such that the rotating peel halves come into contact with reaming head 472.

After the fruit peel halves have been reamed, cam 486 retracts reaming mechanism 470 back to its original position. Cups 408, 409 pass by knock-off bars (not shown) which strip the now empty peel halves from the cups. Shortly thereafter, matched cups 408 and 409 have returned back adjacent to loading mechanism 500 where they receive another fruit to be processed.

The extracted and collected fruit meat chunks and juice extracted from fruits by utilizing one of previously described extraction apparatuses 10, 250 or 400 may now be packaged for human consumption or further refined by, for example, using a common finisher such as the FMC UCF-200 Universal Citrus Finisher, which is available from the Citrus Machinery Division of the FMC Corporation, Fairway Avenue, Lakeland, Florida 33802, USA. With such a finisher, unfinished juice is introduced into the finisher through an intake opening at one end. The product is conveyed by a finisher screw through a cylindrical screen. The finisher screw forces the juice through the screen to a liquid outlet and delivers uniformly dried pomace to the discharge outlet. However, as explained earlier herein, this general type of finisher handles fruit meat very roughly and destroys virtually all of the juice sacs as well as shreds the rag, core, and seeds, thereby releasing the undesirable flavor components found in each. Therefore, it is preferred that the collected fruit meat chunks extracted from fruits by using the previously described extraction apparatuses be further processed by a membrane separator, which is described and illustrated in commonly-assigned, co-pending U.S. patent application Ser. No. 202,173. Briefly, the disclosed apparatus gently tumbles fruit meat chunks through a tubular screen such that a plurality of striker bars strike the fruit meat chunks and separate the juice sacs from the sectional membranes. A collection hopper located below the rotating basket collects the juice sacs and juice for further processing and packaging.

While several particularly preferred embodiments of the present invention have been described and illustrated, it should now be apparent to those skilled in the art that various changes and modifications can be made without departing from the spirit and scope of the present invention. In addition, although the preceding description of the present invention is generally addressed to extracting fruit meat and juice from citrus fruits, the invention can also be applied with equal facility to a wide variety of fruits and vegetables in general. Accordingly, the following claims are intended to embrace such changes, modifications, and areas of application that are within the spirit and scope of this invention.

What is claimed is:

1. A method of extracting fruit meat from a fruit having an outer peel, said method comprising the steps of:
    (a) grasping said fruit with grasping means;
    (b) rotating said fruit;
    (c) cutting an equatorial groove in said outer peel of said fruit, thereby separating said peel into a first peel half and a second peel half;
    (d) inserting a coring element into said equatorial groove;
    (e) rotating said coring element, thereby severing a major portion of said fruit meat from said first and second peel halves, a minor portion of said fruit meat remaining on the inner surface of said first and second peel halves; and
    (f) collecting said major portion of said fruit meat.

2. The method recited in claim 1 further comprising the steps of:
    (g) bringing said inner surface of said first and said second peel halves into contact with a reaming element;
    (h) rotating said first and second peel halves, whereby said reaming element scrapes away said minor portion of said fruit meat; and
    (i) collecting said minor portion of said fruit meat.

3. The method recited in claim 1 further comprising the steps of:
    (g) placing said first and said second peel halves adjacent to fluid jet emitting means, said fluid jet emitting means being in fluid communication with a source of pressurized fluid and being aimed toward said inner surface of said first and second peel halves;
    (h) directing a stream of fluid from said fluid jet emitting means into said first and second peel halves, thereby removing said minor portion of said fruit meat; and
    (i) collecting said minor portion of said fruit meat.

4. The method recited in claim wherein said fruit grasping means comprises at least one pair of resilient cups, each cup having an interior cavity shaped complementary to said fruit, said interior cavity of each cup being in fluid communication with a vacuum source, and wherein said method further comprises the step of supplying vacuum to said interior cavity of said cup.

5. The method recited in claim 4 wherein said vacuum supplied to said interior cavity of said cup is maintained throughout steps (a) through (f), and further comprising the step of discontinuing said vacuum after step (f).

6. The method recited in claim 1 wherein said major portion of said fruit meat severed from said first and second peel halves is substantially spherical in shape.

7. The method recited in claim 2 wherein said grasping means are mounted on two opposed turrets, and wherein step (a) is performed at a loading station, step (c) is performed at a grooving station, steps (d) through (f) are performed at a coring station, and steps (g) through (i) are performed at a reaming station, said two opposed turrets indexing said grasping means between said stations.

8. The method recited in claim 2 wherein said grasping means are mounted on a continuously-rotating turret, and wherein step (a) is performed with a loading mechanism mounted externally of said turret, step (c) is performed by a grooving mechanism mounted externally of said turret, steps (d) through (f) are performed by a coring element mounted on said turret, and steps (g) through (i) are performed by a reaming element mounted on said turret.

9. The method recited in claim 1 wherein said coring element includes a wedge-shaped blade having a sharp leading edge and a blunt trailing edge, whereby during step (e) said sharp leading edge severs said major portion of said fruit meat from said peel while said trailing edge scrapes away said minor portion of said fruit meat from said first and second peel halves.

10. An apparatus for extracting fruit meat from a fruit having an outer peel, said apparatus comprising:
    (a) means for grasping said fruit.
    (b) means for rotating said fruit grasping means;
    (c) means for cutting an equatorial groove in said outer peel of said fruit, thereby separating said outer peel into a first peel half and a second peel half;
    (d) a coring element;
    (e) means for inserting said coring element into said equatorial groove in said outer peel; and
    (f) means for rotating said coring element, thereby severing a major portion of said fruit meat from said first and second peel halves, a minor portion of said fruit meat remaining on the inner surface of said peel halves.

11. The apparatus recited in claim 10 further comprising:
    (g) means for removing said minor portion of said fruit meat remaining on the inner surface of said peel halves.

12. The apparatus recited in claim 11 wherein said means for removing said minor portion of said fruit meat comprises a reaming element.

13. The apparatus recited in claim 11 wherein said means for removing said minor portion of said fruit meat comprises at least one fluid jet in fluid communication with a source of pressurized fluid.

14. The apparatus recited in claim 10 wherein said fruit grasping means comprises at least one pair of resilient cups, each cup having an interior cavity shaped complementary to said fruit.

15. The apparatus recited in claim 14 wherein said interior cavity of each cup is in fluid communication with a source of vacuum.

16. The apparatus recited in claim 10 wherein said equatorial groove cutting means comprises a hollow tube having a first end and a second end, said first end having a swaged, crescent-shaped configuration, said second end being in fluid communication with a vacuum source.

17. The apparatus recited in claim 10 wherein said coring element comprises a first shaft portion, a second shaft portion, and a sharpened semicircular blade portion bridging said first and said second shaft portions.

18. The apparatus recited in claim 10 wherein said coring element comprises a first shaft portion, a second shaft portion, and a semicircular blade portion bridging said first and said second shaft portions, said semicircular blade portion having a sharp leading edge and an expanded trailing edge thereby defining a substantially triangular cross-section.

19. An apparatus for extracting fruit meat from a fruit having an outer peel, said apparatus comprising:
   (a) a rotatable main drive shaft;
   (b) at least one turret mounted on said main shaft;
   (c) a plurality of rotatable fruit grasping means mounted on said at least one turret;
   (d) means for loading said fruit into said fruit grasping means;
   (e) means for cutting an equatorial groove in said outer peel of said fruit, thereby separating said outer peel into a first peel half and a second peel half;
   (f) at least one coring element;
   (g) means for inserting said coring element into said equatorial groove; and
   (h) means for rotating said coring element, thereby severing a major portion of said fruit meat from said first and said second peel halves.

20. The apparatus recited in claim 19 wherein said main drive shaft and said at least one turret mounted on said main drive shaft are continuously rotated.

* * * * *

UNITED STATES PATENT AND TRADEMARK OFFICE
CERTIFICATE OF CORRECTION

PATENT NO. : 4,937,088

DATED : June 26, 1990

INVENTOR(S) : Peter G. Gosselin et al.

It is certified that error appears in the above-identified patent and that said Letters Patent is hereby corrected as shown below:

Column 1, line 28, delete "o" at the beginning of the line.

Column 4, line 16, after "Figure" insert -- 1 --.

Column 5, line 16, after "avoid" delete -- o --.

Column 5, line 35, "7.6 cm x 7.6 cm" should read -- (7.6 cm x 7.6 cm) --.

Column 5, line 50, "1.3 cm" should read -- (1.3 cm) --.

Column 6, line 62, "an" should read -- and --.

Column 8, line 22, "154" should read -- 3/8 --.

Column 9, line 19, "0.64 c.m." should read (0.64 cm) --.

Column 11, line 6, "not shown" should read -- (not shown) --.

Column 15, line 34, "break' should read -- brake --.

Column 16, line 33, "assembles" should read -- assembly --.

Claim 4, line 1, after "claim" insert -- 1 --.

Signed and Sealed this

Tenth Day of September, 1991

Attest:

HARRY F. MANBECK, JR.

*Attesting Officer*

*Commissioner of Patents and Trademarks*